A. S. REAVIS.
TOOL HANDLE AND ATTACHING MEANS THEREFOR.
APPLICATION FILED JULY 13, 1915.
1,192,458.  Patented July 25, 1916.
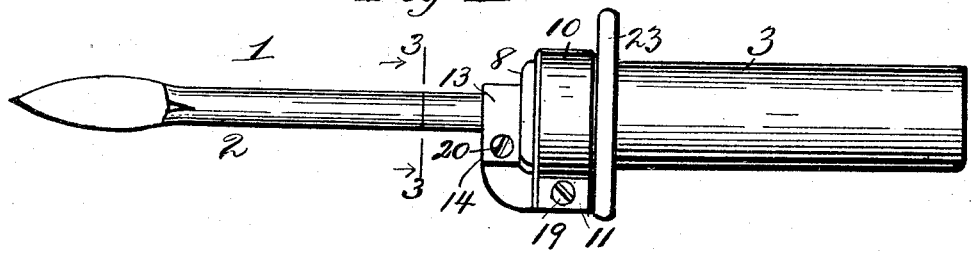
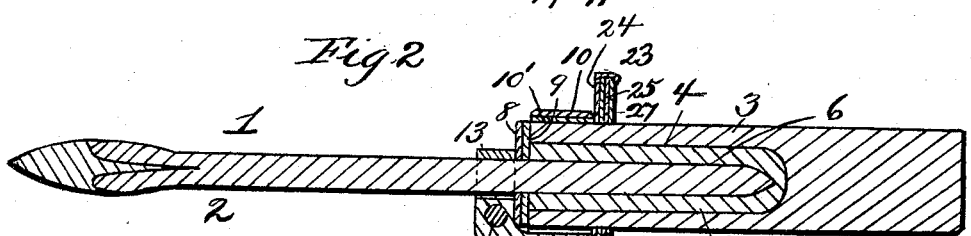
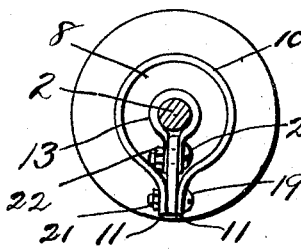
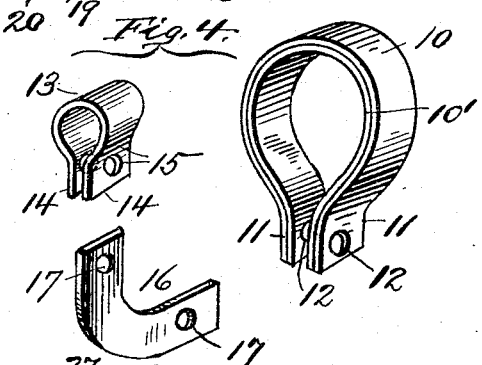
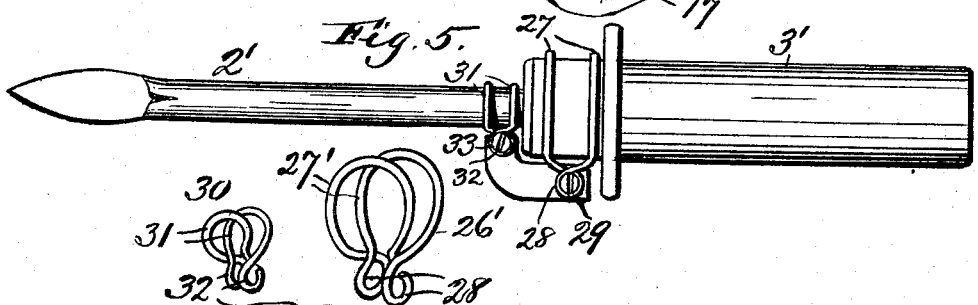
Witness
W. K. Boulter
P. C. Thomas
Inventor
Albert S. Reavis,
By Wm. E. Boulter
Attorney

UNITED STATES PATENT OFFICE.

ALBERT S. REAVIS, OF WASHINGTON, DISTRICT OF COLUMBIA.

TOOL-HANDLE AND ATTACHING MEANS THEREFOR.

1,192,458.  Specification of Letters Patent.  Patented July 25, 1916.

Application filed July 13, 1915. Serial No. 39,707.

*To all whom it may concern:*

Be it known that I, ALBERT S. REAVIS, a citizen of the United States, residing at Washington, in the District of Columbia, have invented certain new and useful Improvements in Tool-Handles and Attaching Means Therefor, of which the following is a specification.

My invention relates to tools in general, and more particularly to those classes of tools used for various purposes which are heated to high temperatures, such as soldering irons, burnishers, etc.

Among the objects in view is to provide a tool of the character set forth wherein means are provided for attaching the metallic shank or point proper to the wooden handle and holding said shank or point firmly in position, and at the same time preventing charring of the handle and consequent loosening of the shank therein, and also preventing the hand from accidentally coming in contact with the heated parts of the tool.

The invention consists in the novel construction, arrangement and combination of parts as hereinafter fully described, illustrated in the drawing and pointed out in the appended claims.

In the drawing: Figure 1 is an elevation of a soldering iron embodying my invention. Fig. 2 is a vertical longitudinal section thereof. Fig. 3 is a transverse section on line 3—3 of Fig. 1. Fig. 4 is a detail view, slightly enlarged, of the attaching collars and intermediate connecting link. Fig. 5 is an elevation of a soldering iron showing a modified construction of the attaching means. Fig. 6 is a detail view of the attaching means.

While I have shown as an example a soldering iron embodying my invention, it will be understood that the invention is equally applicable to various other tools wherein a metallic point or shank is secured to a wooden handle.

Referring particularly to Figs. 1 to 4 inclusive, 1 indicates a tool, as a soldering iron, comprising a metallic point or shank 2 and a wooden handle 3. The handle 3 is provided with a recess 4 within which is arranged a hollow core 5 made of any suitable heat non-conducting material, as asbestos. One end of the shank 2 of the tool is adapted to be driven into the recess 6 of the core 5. Said recess is of such a diameter that when the shank of the tool is seated therein it will be firmly held in position. I preferably make the core of the proper non-conducting material and of the proper dimensions to adapt it to firmly seat in the recess of the handle and extend the full length of said recess, and then push the core into place in the recess. If the shank of the tool is round in cross section then I make the recess in the core to correspond, or if the shank is of angular cross section I make the recess of corresponding shape.

8 indicates a metallic collar adapted to fit over the shank of the tool and is provided on one side with a facing or lining 9 of heat non-conducting material, which lining will seat against the inner end of the handle.

For the purpose of more firmly attaching the point of the tool to the handle, I provide attaching means comprising a metallic collar 10 which fits snugly upon the handle at its inner end and terminating in parallel ears 11 having alined apertures 12, and 13 indicates a collar which fits snugly upon the shank of the tool and terminates in parallel ears 14 having alined apertures 15. The inner wall of the collar 10 is provided with a lining 10′ of some heat non-conducting material, as asbestos, to prevent said collar from charring the handle.

16 indicates a link of the angular shape shown and the ends of which are adapted to be clamped between the ears 11 and 14 of the two collars, and said ends are provided with apertures 17 adapted to aline with the apertures 12 and 15 of said collars. Threaded bolts 19 and 20 are adapted to pass through the alined apertures in the collars and link and carry nuts 21, 22, upon their threaded ends, whereby the parts may be securely clamped together and upon the shank and handle, and thus firmly brace the shank of the tool and hold said shank and handle securely together.

23 indicates a collar fitting snugly upon the handle against the collar 10 and forming a shield to prevent the hand from coming accidentally in contact with said collar 10 when the tool is in use.

I preferably construct the collar of two metallic pieces 24, 25, between which is located a heat non-conducting material, as asbestos, as shown at 26. I provide upon the outer side of the collar adjoining the piece 25, a facing 27 made of any suitable material or composition of materials which will not become unduly heated, and I preferably use for cheapness the material known in the market as "compo."

In Figs. 5 and 6 I show a modified construction of the attaching means, wherein 26' indicates a piece of wire bent to form the two ring-shaped portions 27' adapted to fit upon the handle 3' of the tool and being bent in any suitable manner at the ends to form alined eyes 28 to receive a threaded bolt 29.

30 indicates another piece of wire bent to form ring-shaped portions 31 adapted to fit upon the shank 2' of the tool and bent in any suitable manner to form alined eyes 32 to receive threaded bolt 33. A link similar to that 16 shown in Figs. 1 to 4 is adapted to have its apertured ends engaged by the bolts 29 and 33.

It will be seen that the heat from the shank of the tool will be prevented from charring the interior of the handle which would cause the shank to loosen and render it necessary to fit a new handle. Furthermore in my construction the shank will always remain firmly seated in the handle and is securely braced by the attaching means, and it is not necessary to ever replace the original handle.

What I claim and desire to secure by Letters Patent is:

1. In a tool, the combination with a handle and a shank, of a core of heat non-conducting material seated in a recess in the handle, and a collar arranged upon the shank of the tool and having a facing of heat non-conducting material seating against the inner end of the handle and also against the inner end of the said core.

2. In a tool, the combination with a handle and a shank, of attaching means comprising a collar-shaped portion embracing the handle and provided with alined apertures, a second collar embracing the shank of the tool and provided with alined apertures, an intermediate link provided at opposite ends with apertures alining with the apertures in the said collars, threaded bolts passing through the various alined apertures, and tightening nuts carried by said bolts.

3. In a tool, the combination with a handle and a shank, of a collar embracing the handle and provided with alined apertures, a lining of heat non-conducting material within said collar, a second collar embracing the shank of the tool and provided with alined apertures, an intermediate link having apertures at opposite ends alining with the apertures in the said collars, threaded bolts passing through the various alined apertures, and tightening nuts carried by said bolts.

4. In a tool, the combination with a handle and a shank, of a collar embracing the handle and terminating in parallel ears provided with alined apertures, a second collar embracing the shank and provided with parallel ears having alined apertures, a link having its ends arranged between the ears of the said collars and having apertures alining with the apertures in said ears, threaded bolts passing through the various alined apertures, and nuts carried by said bolts.

5. In a tool, the combination with a handle and a shank, of a shield arranged upon the handle and comprising metallic plates with an intermediate layer of heat non-conducting material, and a facing of heat non-conducting material upon one of the outer faces, as set forth.

In testimony whereof I affix my signature in presence of two witnesses.

ALBERT S. REAVIS.

Witnesses:
 WM. E. BOULTER,
 C. H. DOING, Jr.

Copies of this patent may be obtained for five cents each, by addressing the "Commissioner of Patents, Washington, D. C."